United States Patent [11] 3,610,418

[72] Inventor Andrew S. Calderwood
 Monroeville, Pa.
[21] Appl. No. 855,491
[22] Filed Sept. 5, 1969
[45] Patented Oct. 5, 1971
[73] Assignee Westinghouse Electric Corporation
 Pittsburgh, Pa.

[54] MULTIPLE BORE REVERSE OSMOSIS MODULE
 19 Claims, 6 Drawing Figs.
[52] U.S. Cl. ................................................ 210/321,
 210/336, 210/433, 210/490
[51] Int. Cl. ............................................. B01d 31/00
[50] Field of Search ........................................... 210/23,
 321, 335, 336, 339, 433, 496, 500, 490

[56] References Cited
UNITED STATES PATENTS
3,341,024 9/1967 Lowe et al. .................... 210/490
3,392,840 7/1968 Clarke et al. ................. 210/496 X
3,480,147 11/1969 Kahyok ......................... 210/321

OTHER REFERENCES
" Saline Water Conversion Report for 1967," 421 pages, published by Supt. of Documents, U.S. Govt. Printing Office, received in U S. Pat. Office, Nov. 1, 1968, pages 120– 122 relied on.

Primary Examiner—Frank A. Spear, Jr.
Attorneys—F. Shapoe and Alex Mich, Jr.

ABSTRACT: A reverse osmosis apparatus, comprising an open pore module of bonded, resin-coated filler particles having sealed, nonporous terminal ends and a plurality of spaced feed bores, lined with semipermeable membranes and connected for series flow by means of attached end plates, is made by coating granular filler particles with a resin solution, pouring the resulting composition into a mold of suitable configuration, curing the resin, removing the mold to provide a module having terminal ends and a plurality of spaced-apart bores therethrough, impregnating the terminal ends of the module and the terminal ends of the bores with a liquid-impermeable polymeric sealing composition having a postgellation shrinkage of less than 4 percent, curing the sealing composition, inserting semipermeable membranes into the bores, sealing the membranes into the bores by suitable sealing means and attaching end plates to provide for series connection of the bores.

PATENTED OCT 5 1971

WITNESSES
Theodore F. Wrobel
Daniel P. Cillo

INVENTOR
Andrew S. Calderwood
BY Alex Mich Jr.
ATTORNEY

MULTIPLE BORE REVERSE OSMOSIS MODULE

BACKGROUND OF THE INVENTION

This invention relates to fabricating and sealing porous modules made of bonded, resin-coated filler particles, which serve as a support for cellulose acetate or other semipermeable membranes in a reverse osmosis apparatus.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

A reverse osmosis system has application in many areas. The areas of greatest present interest are making potable water from brackish or poluted water and cleaning up waste streams. Other applications are taste improvement of potable but objectionable water, softening of municipal waters, water sterilization, and the concentration of food (orange juice, tomato juice, cheese whey, and syrups).

Materials that have been tried as reverse osmosis membrane supports have included foams, wire screen, porous ceramic and fabric which is wound around the membrane to form a sump. Generally, whenever the foams are reasonably rigid they were also impermeable. The screen and ceramic were found to be too expensive or to have rough surfaces which would damage the membrane. Such supports are generally placed in metal casings, U.S. Pat. No. 3,228,876, or porous resin impregnated fiberglass casings, U.S. Pat. No. 3,392,840.

Resin-bonded sand supports, such as those disclosed in copending application Ser. No. 754,581, filed on Aug. 22, 1968, and assigned to the assignee of this invention were found to be self-supporting inexpensive and capable of fabrication into rigid modules, with good permeability and a smooth membrane support surface, without elaborate production equipment. Such sand modules, however, tended to leak easily at the module terminal ends and membrane sealing points.

SUMMARY OF THE INVENTION

Accordingly, it is an object of this invention to provide new and improved methods of sealing reverse osmosis semipermeable membranes into the bores of supportive, porous modules made of resin-bonded filler particles.

It is another object of this invention to provide new and improved methods of sealing the porous ends of supportive reverse osmosis modules made of resin-bonded filler particles.

It is a further object to provide an improved reverse osmosis support module, and a reverse osmosis apparatus comprising a porous support module, having sealed nonporous terminal ends, of resin-bonded filler particles containing bores having semipermeable membrane linings sealed therein.

Briefly, these objects are accomplished by coating catalyst and phenolic resin solution onto filler particles, having a rigid granular structure and a particle size between 40 and 500 microns, and pouring the resulting free-flowing particulate composition into a suitable mold, coated with a lubricant. The mold contains a plurality of core shafts disposed within a mold wall. These shafts may be metal, plastic, or other type rods or tubes in an axially disposed, spaced-apart configuration. After the resin-coated filler particles are cured into a strong rigid open pore structure, the rods or tubes are removed to provide a support module having terminal ends and a plurality of axially disposed spaced-apart bores extending from end to end therethrough. The ends of the module are ground or cut flat. Then the terminal ends of the module and the terminal ends of the bores are coated with a liquid-impermeable polymeric sealing composition which must penetrate to a depth of at least one thirty-second inch This module-sealing composition must have a postgellation shrinkage upon cure of less than 4 percent. Semipermeable membranes are inserted into those bores of the module that are to be feed water bores and the membrane ends are either coated with a resinous primer and sealed with a liquid-impermeable water-curable polymeric adhesive or by means of inserted rubber or plastic grommets. End plates which allow circulation of feed water through the feed water bores are than aligned with the bores and glued or bolted to the ends of the module.

BRIEF DESCRIPTION OF THE DRAWINGS

For a better understanding of the nature and objects of the invention, reference may be made to the following drawings, in which.

DESCRIPTION OF THE PREFERRED EMBODIMENTS

Figure 1:
FIG. 1 is a diagram showing the principle for extracting fresh water from sea or contaminated feed water by reverse osmosis.

FIG. 1 illustrates a typical tubular-type reverse osmosis system. Sea water or contaminated feed is pumped through a battery of support tubes 1. The pump 2 must exert a pressure greater than the osmotic pressure of the feed and can operate as high as 4,000 p.s.i. The tubes can be mounted in batteries of about 150 each. They serve to support the reverse osmosis membrane contained within the tube wall. The membrane can be made of modified cellulose acetate, i.e., aqueous magnesium perchlorate and acetone modified cellulose acetate having an acetyl content of about 39 percent by weight.

The tube walls that support the reverse osmosis membranes must be able to withstand the pressure exerted on them by the pump and must be able to allow egress of the pure water effluent 3 into a collecting pan 4. For sea water, several stages of this type may be required before the water is usable.

In the fabrication of the support tubes or modules of this invention, a resin, usually in solution, with an added catalyst, is coated into filler particles in such a way as to leave a thin, dry, uncured film on each filler particle. The resulting particulate composition is free flowing and is cast into a mold of the desired configuration. The mold is then heated to cure the resin. The mold is then cooled and removed. The curing process transforms the filler-resin catalyst composition into a strong rigid open pore tube of bonded resin-coated filler particles. The tube contains voids or pores between the resin-coated filler particles allowing egress of the pure water which has passed through the reverse osmosis membrane supported by the inside of the tube walls.

On curing, the thin film of resin bonds each filler particle to the adjacent particles. It is readily seen that the type and amount of resin used, the size of the filler particles and the wall thickness can be adjusted to give a considerable range in the strength and porosity of the resultant tube. However, for any given filler-resin tube the strength increases with increasing resin content and the porosity decreases.

Figure 2:
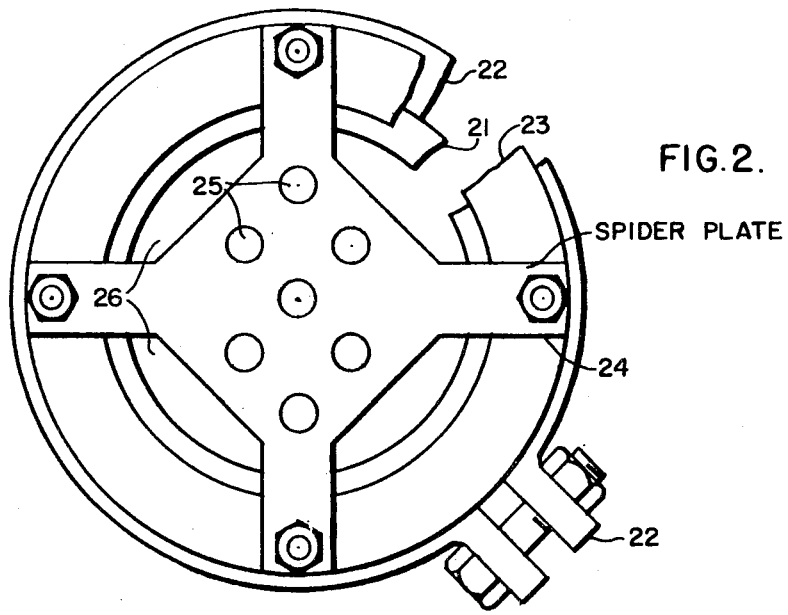
FIG. 2 is a top view showing a mold that can be used in making the modules of this invention.

The mold which was generally used to cast the tubular modules is shown in FIG. 2. The mold wall 21 was either a brass, stainless steel, aluminum or phenolic resin tube having an outside diameter of about 4 inches and a wall thickness from between one-fourth to one-sixteenth inch. Almost any material can be used which will offer support if used as a supporting casing and which can withstand the resin cure temperature. A metal split flange 22 was attached to the top of the mold wall. A plexiglass or other spacer 23 was laid on the flange, and spider plate 24 bolted through the spacer to the split flange 22. The spider plate held one-half inch outside diameter shafts 25 in an axial or other suitable configuration. These shafts can be rods or tubes of a plastic such as phenolic resin, stainless steel-reinforced plastic, solid metal rods such as brass or aluminum, hollow metal tubes which may be water cooled for removal, or collapsible-type shafts. Resin-coated filler particles were poured through openings 26 around the rods or tubes to fill the area within the mold wall. A solid end plate was then substituted for the spacer and the mold placed in the oven. After curing the resin-coated particulate filler, the split flange, end plate, spider plate, and rods or tubes were removed, leaving a porous module of resin-coated filler particles, having a plurality of spaced-apart interior bores. The mold wall 21 was then generally removed, except in those instances where it was retained as a reinforcing casing for high-pressure modules. In such cases if the casing were not porous, a single hole or a plurality of holes could be drilled in the casing for removal of the pure water effluent. Since the resin-bonded filler module itself is strong and self-supporting, only a very thin casing would be necessary for high-pressure operation.

In another modification, the centermost bore of the module could be used as an effluent product bore, which would remove purified effluent from the module. In such a case the casing would be nonporous and would not have any holes drilled in it. The effluent product bore would not contain a reverse osmosis membrane. The remaining feed water bores surrounding the central effluent bore would have reverse osmosis membrane linings.

Figure 4:
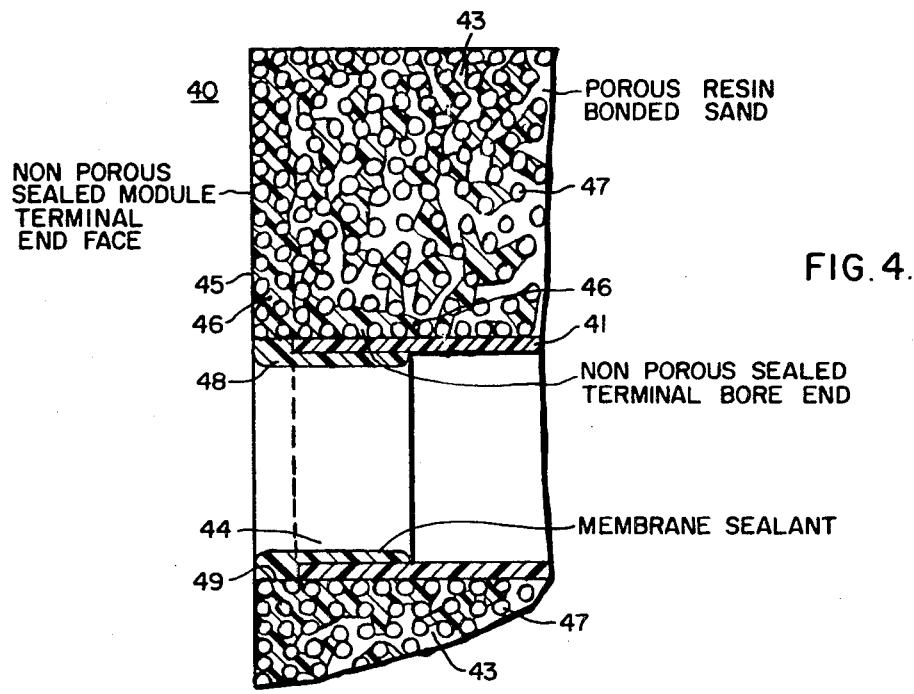
FIG. 4 is an enlarged cross-sectional view of a portion of the module of FIG. 3 showing the preferred membrane tube seal in combination with the module sealant impregnated into the terminal end of the module and the terminal end of the bore.

Referring now to FIG. 4 of the drawings, a side elevational view of the resin-bonded module 40 is shown, with a reverse osmosis membrane 41 lining one of the module feed water bores 42.

Since it is essential that the purified effluent product water be kept separate from the feed water, the membranes must be properly sealed into the module feed water bores. As the porous resin-coated filler particle matrix 43 contains the product water, the problem occurs at two places. The membranes inserted into the support module must be sealed at the terminal end of the feed water bores 44 and also the porous terminal ends of the module 45 must be sealed where the end plates are to be attached.

It has been found that the porous filler particle matrix of the module can be sealed with suitable liquid-impermeable polymeric module sealant composition 46. Such module sealant should be either thixotropic or have a low viscosity, in order to penetrate the pores 43 between the end granules 47 to form a liquid impermeable seal. The resin module sealant must cure with less than 4 percent postgellation shrinkage, otherwise the ends of the module can crack, especially if it contains a large number of bores. Postgellation shrinkage is defined as percent change in volume of the sealant composition after the liquid stage has been passed and the gellation or thermoplastic stage has been reached, including thermal shrinkage brought about by cooling of the solid sealant to room temperature. Volumetric shrinkage may be determined by the use of a closed mold to which is attached an oil-filled pipet. The oil level will decrease and can be measured as the resin volume decreases.

I found that a liquid diglycidyl ether of bisphenol A having a viscosity between 7,000 to 10,000 c.p., at 25° C. could be made into an excellent module sealant. When used with triethylenetetramine catalyst, the composition has a low viscosity and a rapid cure cycle with little shrinkage (about 2.0 percent postgellation shrinkage). The module sealant may also contain fine filler particles to help reduce thermal shrinkage. Ultrafine filler particles (less than 20 microns) can be used to give the module sealant thixotropic properties, so that penetration into the module can be easily controlled. This module sealant 46 was coated onto the terminal ends of the sand module and the terminal ends of the bores after which it was cured. This module-sealing method provides a simple yet effective way of preventing contamination of the purified water effluent. It allows use of end plates having flat mating surfaces which require minimal machining and alignment.

The main problem in assembling a reverse osmosis apparatus from resin-coated sand modules had been sealing the ends of the membranes, lining the feed water bores, against the sealed terminal bore ends. The cellulose acetate membranes must be kept wet, as they lose their rejection properties after drying for about 20 minutes and shrink by as much as 40 percent of their original diameter if allowed to dry in air. Conventional adhesives either contain solvents which destroy the membrane or water prevents adhesion and curing of the adhesive. I found that a preferred membrane sealant which would cure in the presence of water and adhere to the membrane could be made from a polysulphide rubber based adhesive catalyzed with lead peroxide, if a polyurethane-based primer were first used, and that this sealant would not harm the membrane.

The reverse osmosis membrane 41 in FIG. 4 was inserted into the sand module 40 whose terminal end faces 45 and terminal bore ends 44 had been sealed with module sealant 46. The membranes were about one-eighth inch shorter at each end than the module bore. The terminal bore ends were sealed down the bore to about a 1-inch depth as shown in FIG. 4. The end of the membrane and the end of the module bore were coated with primer and the membrane sealant 48 applied so as to overlap the end of the tubular membrane and contact the module sealant at point 49. Thus, the membrane sealant is kept separated from the porous sand matrix. When all the membranes had been sealed, the module was left in water overnight to cure the water curable rubber adhesive.

Such a sealing system effectively keeps the product water separated from the feed, while eliminating the need for expensive machining and time-consuming alignment of end plates. Such a sealing system is compatible both with the resin-bonded filler particles and the membrane, in that the module sealant 46 cures with little shrinkage, insulates the nonsealed resin-bonded filler particles from the membrane sealant 48, and provides a good adhesive surface for the membrane sealant. The membrane sealant is compatible with the membrane and is curable in the presence of water so that the membrane does not dry out during the membrane-sealing operation.

Figure 5:
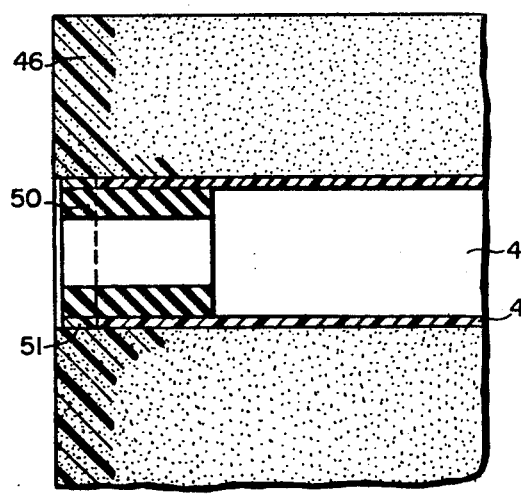
FIG. 5 is a cross-sectional view of the module of FIG. 3 showing a second type of membrane tube seal.
Figure 6:
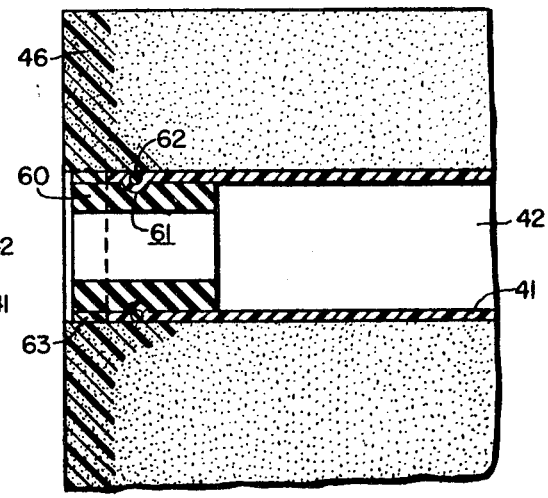
FIG. 6 is a cross-sectional view of the module of FIG. 3 showing a third type of membrane tube seal.

Other membrane seals are shown in FIGS. 5 and 6. The seal of FIG. 5 comprises an annular rubber or flexible plastic grommet 50, having an outside diameter substantially the same as the inside diameter of the feed water bore 42. The grommet presses the membrane 41 against the wall of the bore while an adhesive 51 can be used to seal the joint between the rubber tube and the bore. The grommet is positioned inside the membrane at the terminal end of the feed water bore. The seal of FIG. 6 comprises an annular plastic or metal grommet 60 having an outside diameter substantially the same as the inside diameter of the bore 42. This grommet has a circumferential groove 61 around it. The membrane 41 is slid over the plastic or metal tube and the end of the membrane quickly dried with hot air so that it shrinks into the groove. A compressed rubber or other type O-ring seal 62 is then mated to the groove 61 to help hold the membrane in place and seal the joint between the plastic grommet and the bore, although adhesive 63 may also be used. This grommet is positioned inside the semipermeable membrane at the terminal ends of the module.

Figure 3:
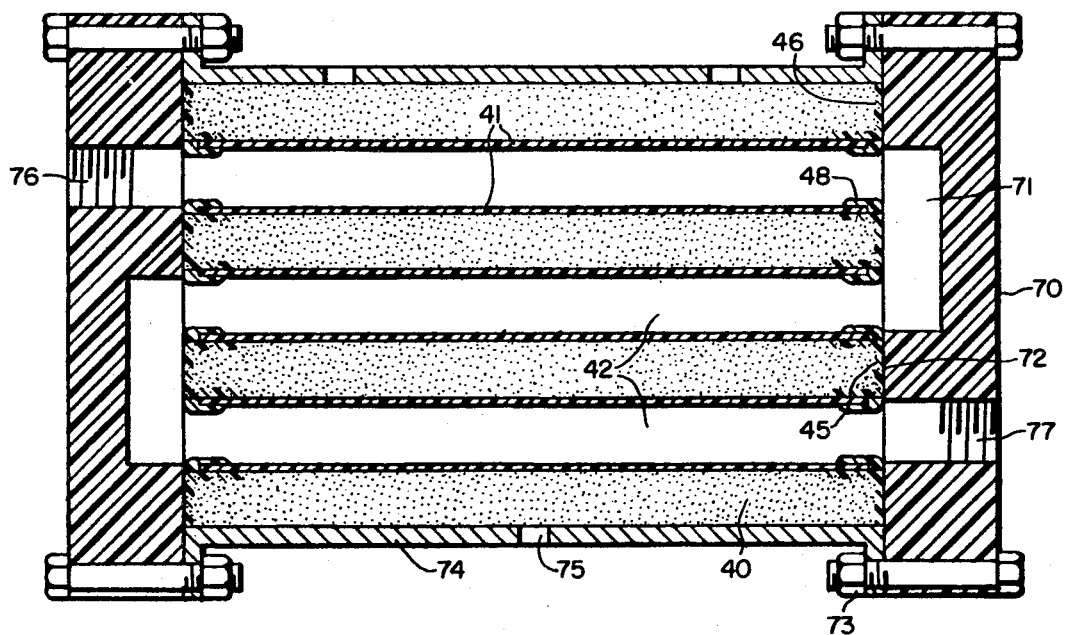
FIG. 3 is a cross-sectional view of a high-pressure reverse osmosis apparatus consisting of a supportive, porous module of resin-bonded filler particles having sealed nonporous terminal ends, sealed reverse osmosis membranes and attached end plates.

The reverse osmosis apparatus of this invention is shown in FIG. 3. It consists of a module of resin-bonded filler particles 40 containing a plurality of spaced-apart bores 42 and tubular reverse osmosis membranes 41. The central bore may be an effluent bore, not containing a membrane and used to collect purified water, with a plurality of feed water bores containing membranes surrounding it. Generally, the bores will be in an axially disposed, radial configuration. The terminal end faces of the module 45 are impregnated with water-impermeable polymeric module sealing composition to provide liquid impermeable smooth module end faces and terminal bore ends. The membranes lining the bores are sealed against the bore ends, preferably by a water-curable rubber membrane sealant 48 which overlaps the membrane and contacts the module sealant 46. End plates 70 having water channels 71 and flat mating surfaces 72 which connect the bores and provide for series feed waterflow are glued or other wise attached or mated to the flat sealed module end face. For high-pressure operation, the end plate may be bolted to the end face by tie bolts 73, or other suitable means, in which case a supporting casing 74 which may have effluent holes 75 bored into it can be used. Also shown are feed entrance 76 and fed exit 77.

The finely divided filler particles that can be used in the various components of this invention may be spherical, oval cubical, or of other irregular configuration. Some examples of suitable filler particles are foundry sand, silica, silicon carbide, zircon, quartz, alumina, beryl, glass, limestone, magnesium aluminum silicate, calcium silicate, sillimanite ($Al_2O_3SiO_2$) or any other rigid filler with a granular structure that is compatible with the resin system it is used with.

Especially suitable fillers for lightweight module construction are hollow spherical plastic or glass beads, ground pumice stone and the like. The preferred average particle size range of fillers for use in the module construction is between 50 and 250 microns, although the outer limits are between 40 and 500 microns. Below 40 microns, the resin-filler support tube lacks the desired porosity for low resistance to waterflow and above 500 microns the tube does not properly support the membrane.

Especially suitable fillers which impart thixotropic and flatting properties to the liquid-impermeable module sealant composition are colloidal silica, colloidal alumina, and magnesium aluminum silicate, all of which have particle sizes of less than 20 microns. The preferred particle size range of fillers which is useful to impart thixotropic properties to the module sealant composition is between about 0.001 and 20 microns. This type filler gives the composition thixotropic properties when used at concentrations of about one-half to 10 percent of the resin weight and allows smooth, flat terminal end faces and terminal end bore surfaces, after a single application.

The upper limit of particle sizes that can be used in the module sealant composition is about 150 microns. The fillers can constitute up to about 50 weight percent of the module sealant composition. Fillers at these higher concentrations are especially useful to reduce postgellation shrinkage. Similarly, fillers in the particle size range of about 0.001 to 150 microns can be used in the water-curable polymeric adhesive used to seal the reverse osmosis membranes in the module bores, up to about 50 weight percent of the adhesive. Different fillers and particles sizes can be used together, to provide a combination of properties.

The weight percent resin that can be used to coat the filler particles used to make the modules of this invention will vary depending upon the type filler and its fineness. For example, the weight percent resin will range from 2 to 18 percent of the coated filler particle weight when sand is used as the module filler constituent and 1 to 10 percent when zircon is uses as the filler. The lightweight fillers will cause correspondingly higher weight percent resin values. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

A variety of resins can be used to coat the filler particles in the tube, but phenolic resins are preferred because they can be brought cheaply and in readily usable form. Phenolic resins are well known in the art and are thoroughly discussed in Megson, *Phenolic Resin Chemistry*, Academic Press, 1958, particularly chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfural.

Other resins well known in the art which may be used as the coating and bonding agent in the resin-bonded filler module of this invention include: polyglycidyl ethers (see Lee and Nevill, *Handbook of Epoxy Resins*, McGraw-Hill 1966, particularly chapter 2), polyesters and allyl resins (see Bjorksten, *Polyesters And Their Applications*, Reinhold Publishing Corporation, 1956, pages 1–34), silicones and furane resins (see Brydson, *Plastic Materials*, D. Van Nostrand Company, 1966, chapters 24 and 25), polyimide and polyamide-imide resins (see Frost and Bower, *Aromatic Polyimides*, J. Polymer Science, Part A, Vol. 1, 1963, 3,135–3150 and U.S. Pat. Nos. 3,179,631; 3,179,632; 3,179,633 and 3,179,634 on polyimides and U.S. Pat. No. 3,179,635 on polyamide-imides).

The module sealant can be any liquid-impermeable polymeric sealing composition having a postgellation shrinkage upon cure of less than 4 percent. It must be able to seal the pores between the resin-bonded filler particles and polymerize in place. The module-sealing composition may contain filler particles and polymerization catalysts. The module sealant should impregnate the terminal ends of the module and the sides of the bores to a sealing depth between one thirty-second inch to 1 inch and preferably about one-eighth inch. Impregnation less than one thirty-second inch will generally result in pinholes through the module sealant layer and impregnation over 1 inch is unnecessary and expensive. Module-sealing compositions having viscosities below 5,000 c.p. at 25° C. will run into the voids between the resin-coated filler particles resulting in excessive use of sealant. Module-sealing compositions having viscosities over 100,000 c.p. at 25° C. would be difficult to impregnate easily unless they are thixotropic. It is critical that the liquid-impermeable polymeric module sealing compositions postgellation shrinkage upon cure be less than 4 percent, otherwise the ends of the module may crack after the curing step, especially if the module contains over seven bores.

The polymeric materials that can be used in the module sealant composition can include thermosetting and thermoplastic resins, rubbers and combinations of these. Although thermoset resins and especially polyglycidyl ethers (epoxy) resins are preferred, some examples of other suitable polymeric materials would also include phenolics, polyesters, silicones, polystyrenes, polyimides, polyamide-imides, polycarbonates, polyurethanes, polysulfones and polypropylene oxide resins (see Brydson, *Plastic Materials*, chapters 8, 16, 17 and 23), silicone rubbers nitrile, butyl and polysulfide rubbers (see Brydson, *Plastic Materials*, chapters 8.4, 16.7 and 25.6).

The membrane sealant can be any liquid-impermeable, water-curable polymeric composition having adhesive properties. It must be curable in the presence of water. It must adhere to the reverse osmosis membrane without destroying it and be compatible with the module sealant which it contacts. Such compositons will generally be rubber or resins based. Polysulfide rubber-based compositons are especially suitable because of their excellent weatherability properties. The compositons will also generally contain plasticizers such as benzothiazole disulfide or dibutyl phthalate, curing agents such as lead peroxide or calcium peroxide, fillers and small amounts of materials such as polyvinyl acetate or phenolic resin to increase tackiness. This may be used with a polyurethane, furane or vinyl acetate-based primer. The primer generally consists of the resin in combination with a solvent and curing agent. Polyglycidyl ether (epoxy) based compositions may also be used as the membrane sealant but such compositions often must contain dry-powdered molecular sieves (zeolites or crystalline-metal aluminosilicates such as $Na_{12}(AlO_2)_{12}(SiO_2)_{12}$ or other drying agents to absorb water on the membrane surface and improve adhesion without affecting epoxy cure. Glycerine may also be used in the epoxy composition for this purpose. Other resins that might be used as a base for these membrane adhesive compositions include polyesters and polyurethanes.

Solvents which have been found to be suitable for use in this invention comprise, in general, alcohols, such as methanol, ethanol, propanol, isopropanol, and the like; ketones such as acetone, aromatic hydrocarbons such as xylene, toluene, benzene, and the like, and the normally liquid organic solvents of the N,N-dialkylcarboxylamide class such as dimethyl acetamide and the like. It will be understood, of course, that the particular solvent employed must be a solvent for the particular resin used.

The majority of these resins are curable to a solid state by heating them in the presence of a suitable polymerization catalyst. Examples of such catalysts would include, for example when the resin is a phenolic resin, hexamethylenetetramine, formaldehyde, paraformaldehyde, furfuraldehyde, acetaldehyde, polymethylolphenols, alkali metal and alkaline earth metal salts of the polymethylolphenols. When the resin is in epoxy resin, suitable catalysts would include dicyandiamide, triethanolamine borate, metaphenylenediamine, diphenylamine, melamine, quinoline, hexamethylenetetramine, urea, and substituted ureas such as alkyl ureas, an example being tetraethyl urea, and guanidines. When the resin is a polyester resin, examples of suitable catalysts would include benzoyl peroxide, laurol peroxide, methyl ethyl ketone peroxide, t-butyl hydroperoxide, ascaridole, tert-butyl-perbenzoate, di-t-butyl diperphthalate, ozonides and the like. When the resin is a silicone, examples of suitable catalysts would include, dicumyl peroxide, benzoyl peroxide, laurol peroxide, methyl ethyl ketone peroxide, t-butyl hydroperoxide, di-t-butyl diperphthalate, ozonides, and the like. When the resin is a polystyrene resin examples of suitable catalysts would include benzoyl peroxide, laurol peroxide, tertiary-butyl hydroperoxide, ditertiary-butyl peroxide and tert-butylperbenzoate. When rubbers are used, suitable curing agents would include inorganic oxidizing agents such as lead peroxide, calcium peroxide, manganese dioxide and the like.

The preparation of reverse osmosis membranes is well known in the art. Generally, a polymeric film forming cellulose material such as a cellulose ether or a cellulose ester is dissolved in a volatile solution containing an organic solvent such as acetone and a swelling additive such as formamide. This casting solution is then cast and a portion of the solution allowed to evaporate causing a dense osmotic skin to develop at the air-solution interface. The cast film is then immersed in a leaching bath after which it may be cured in hot water. The cast membrane may then be rolled and sealed into tubular form or formed into tubular bodies by any other convenient method. Further reference may be made to U.S. Pat. Nos. 3,133,132 and 3,344,214 for details on the compositions and casting techniques that can be used.

It is felt that the invention should not be limited to the particular polymeric compositions used; that any catalyst-resin system can be used to bond the filler particles if it forms a rigid porous module, any polymeric composition, filled or unfilled that will water seal the module and bore ends, having less than 4 percent postgellation shrinkage upon cure is suitable as a module sealant, and any combination of polymeric compositions that will adhere to the membrane and the module sealant and cure in the presence of water without degrading the membrane is suitable in a membrane-sealing means.

EXAMPLE I

A reverse osmosis module was made containing four axial bores. To 1,000 grams of foundry sand having an average particle size of about 180 microns was added 9.75 grams of hexamethylenetetramine catalyst. This was mixed in a 3-foot diameter Simpson Mixer-Muller for 1 minute. Then 56.25 grams of the reaction product of a phenol and aldehyde, in solution, having a viscosity at 25° C. of 4,200 cp. and a solids content at 135° C. of 67 percent (sold commercially by Hooker Chemical Corporation under the trade name Durez Phenolic Resin 18115), was added and the combination mixed for about 10 minutes until it was dry and free flowing. It was important to stop the mixer at this point as overmixing rubbed the coating off the sand. This resin catalyst-coated sand composition was poured into an 18-inch long, 3-inch outside diameter ⅛-inch thick cylindrical brass mold wall. This contained within it, 4 axial ½-inch outside diameter brass tubes symmetrically placed and held by retaining plates bolted to flanges on the mold wall. The inside of the brass mold wall and the tubes were spray coated with polytetrafluoroethylene. The resin-coated sand was sieved and poured into the mold through a center hole in the top retaining plate. The mold was continuously vibrated on a Syntron Vibrating table during the filling operation. When the mold was full, it was placed vertically is an oven for curing at 175° C. for 16 hours. The oven was a Norman kiln made of sections of firebrick with an electrical heating element in the base. The temperature in the kiln was controlled by thermocouple temperature controller. The final stage was to allow the mold to cool. The brass tubes were difficult to remove and had to be pushed out with a steel rod in an arbor press. The outer casing of brass could be removed fairly easily by heating it for a short time and pushing out the sand module.

The module end faces were then cut flat and coated with a resin composition to seal the end faces and form a solid impervious smooth module sealant layer about ¼ inch thick. The resin composition had to be low viscosity in order to penetrate into the cured sand module and yet have a rapid cure cycle with little postgellation shrinkage so as not to crack the sand module. Shrinkage becomes an important factor after the resin composition has been mixed and applied to the module, i.e., during cure and cooling within the module. A module sealant containing 100 grams of a liquid diglycidyl ether of bisphenol A having a viscosity between 7,000 and 10,000 cp. at 25° C. with an epoxy equivalent weight of 182-195 (sold commercially by Ciba Products Co. under the trade name Araldite 6005 epoxy) was mixed with 15 grams triethylenetetramine curing agent. This gave a low-viscosity sealant with a 25-minute pot life at room temperature and only about 2.0 percent postgellation shrinkage upon cure. This module sealant was put on the sand module end faces with a spatula and cured in 5 minutes using a 300-watt heat lamp 3 inches from the surface, giving a temperature around 190° F. Two coats were required to seal the sand module. The first penetrated to a depth of about one-fourth inch around the bores and the second gave a smooth flat surface on the end face surface. To prevent the module sealant from running down inside the holes too far, ½-inch diameter Teflon plugs were inserted in the holes and were removed after curing, leaving a smooth epoxy face at the end of the bores for the membrane seals.

Uncured cellulose acetate membrane tubes having a ½-inch outside diameter were then inserted into the bores of the module. The membranes were cast from a casting solution containing 25 weight percent cellulose acetate, 45 weight percent acetone and 30 weight percent formamide (methanamide). They were then stored under water. These membranes must be inserted and sealed into the module before they dry out.

The ends of the membrane were plasticized with a 4:1 mixture of methanol and triacetin and were held against the epoxy sealed ends by inserting a ½-inch length of ½-inch outside diameter and ¼-inch inside diameter annular rubber grommet by folding it in a U shape around thin pliers. When unfolded the tubing held the plasticized membrane tightly against the solid bore terminal end. To prevent movement and complete the sealing, the rubber section was bonded to the end of the bore with a methyl 2-cyanoacrylate-based water-activated adhesive (sold under the trade name of Eastman 910 by Eastman Chemical Product Co.). The module was completed with solid plexiglass end plates with return bends to connect the bores to give series flow of the feed water. One-eighth-inch rubber gaskets having holes matching the bores were placed against the terminal end of the module and the end plates attached by means of tie bolts.

The module was then cured by first filling the module and lines with cold water, then switching the pump to the hot water circuit and the flow adjusted to give a pressure of 3 p.s.i.g. in the module. The completed module operated successfully on tapwater at pressures up to 80 p.s.i. Some Congo Red die was added to the circulating water to test for leaks, the die is colloidal and was rejected by the membrane with no leaks at the membrane or module seals. The feed water contained 150 p.p.m. impurities. The purified water flux through the system was 1.4 gal./sq. ft.-day at 70 p.s.i. with 80 percent rejection.

This rubber grommet, shown in FIG. 5 of the drawings, had a ¼-inch interior diameter which caused a noticeable pressure drop in the circulation of the feed water through the module. It also required expensive manual work.

Another effective but expensive seal was used in a similar reverse osmosis apparatus module by quickly drying the membrane tube end in a hot airstream into a plastic tube having an annular shape and a circumferential groove on its outside surface as shown in FIG. 6 of the drawings. The plastic tube was slipped inside the membrane end which was quickly dried with hot air causing it to shrink into the groove. It was further held in place by a rubber O-ring which mated into the groove and also provided a seal against the solid end of the module bore.

EXAMPLE II

A reverse osmosis module was made containing seven axial bores. An 18-inch long, 3-inch outside diameter ⅛ inch thick cylindrical phenolic plastic mold wall was used. The mold uses was similar to that shown in FIG. 2 of the drawings. The spider plate held 7 axially placed ½-inch outside diameter aluminum tubes. Resin-coated sand particles having an average particle size of about 115 microns were prepared as in example I and poured into the mold through the opening between the spider plate and the plexiglass spacer. The resin was then cured. It was found that best results were obtained by first preheating the oven to 95° C. This allows the thermoplastic resin to melt and the sand to bond into a uniformly adhering mass. After 2 hours the temperature was slowly raised to 190° C. for 16 hours to give the final cure. The aluminum tubes were then pulled from the mold by hand while the module was hot.

The module was left in the phenolic plastic mold wall which was then used as a supportive casing which will allow use of higher feed pressures. Holes were drilled through the phenolic supportive casing. The sand module end faces were cut flat and an epoxy module sealant applied. The module sealant contained 100 grams of a liquid diglycidyl either of bisphenol A having a viscosity between 7,000 and 10,000 cp. at 25° C. with an epoxy equivalent weight of 182-195 (sold commercially by Ciba Products under the trade name Araldite 6005 epoxy) mixed with 51 grams colloidal silica having a particle size of 0.015 microns (sold under the trade name Cabosil by Cabot Corporation). This mixture was put in a Waring blender for 10 minutes to uniformly distribute the ultrafine filler particles. Fifteen grams triethylenetetramine curing agent was then added. This gave a sealant with a thick consistency and less than about 2.0 percent postgellation shrinkage upon cure. This module sealant was applied to the terminal ends of the module and the terminal ends of the bores. The shear action of brushing the sealant onto the module end and into the bores to a bore depth of about one-half inch caused a large reduction in viscosity to a fluid liquid which easily penetrated the pores between the resin-coated sand granules. Only a single coat was needed, due to the thixotropic and flatting properties caused by the ultrafine silica, to give penetration of about one-eighth inch and smooth end faces. The module sealant also serves to insulate the membrane sealant from the resin-coated sand and eliminates any possibility of sand module cracking due to membrane sealant shrinkage upon cure.

The uncured cellulose acetate membranes described in example I were then inserted into each of the module bores. The membranes were cut at the ends so that they were about one-eighth inch shorter at each end than the sand module. The end of the membranes was coated with a polyurethane-based primer (Thiokol Chemical Corp. TPR-412-1 primer). A membrane sealant of 121 parts by weight polysulfide rubber-based compound (sold commercially by Thiokol Chemical Corp. as T-86N sealant) catalyzed with 15 parts lead peroxide was then applied to the primed membrane end and the epoxy impregnated bore end so that the rubber membrane sealant overlapped the membrane and contacted the module sealant as shown in FIG. 4 of the drawings. The primer helps assure adhesion of the membrane sealant to the wet cellulose acetate membrane. The rubber sealant was applied to the membranes and bore end with a small spatula to a thickness of about one-sixteenth inch. When all the tubes were sealed, the module was left in water overnight. The module was then inspected for leaks and excess sealant was removed. The end faces were then dried. Solid end plates with return bends to give a series flow were glued on with module sealant using a heat lamp to cure the sealant at 180° F. for 5 minutes. The completed module operated successfully on tapwater at pressures up to 80 p.s.i. with no leaks at the seals or at the membrane. The feed water contained 230 p.p.m. impurities. The purified water flux through the system was 1.15 gal./sq. ft.-day at 70 p.s.i. with 86-percent rejection.

Another membrane sealant composition that was similarly applied to the membranes and bore ends of similar modules with almost as good sealing results consisted of 100 grams of a liquid diglycidyl ether of bisphenol A having a viscosity between 7,000 and 10,000 cp. at 25° C. with an epoxy equivalent weight of 182-195 (Araldite 6005 epoxy), 8 grams colloidal silica having a particle size of 0.015 microns, 15 grams triethylenetetramine curing agent, 2 grams of a nitrile-based rubber solution (sold under the trade name of Pliobond by Goodyear Rubber Co.) to increase tackiness and 30 grams of ground oven-dried molecular sieve $(Na_{12}(AlO_2)_{12}(SiO_2)_{12})$ to absorb water and increase sealant adhesion to the membrane.

I claim as my invention:

1. An open pore reverse osmosis membrane support module made of bonded resin-coated filler particles having a granular structure and an average particle size between 40 and 500 microns, the resin coating constituting about 2 to 18 percent of the coated filler particle weight, the module having terminal ends sealed with a liquid-impermeable polymeric sealing composition comprising catalyst and polymers selected from the group consisting of thermoset resins, thermoplastic resins, rubbers and mixtures thereof, said sealing composition having a postgellation shrinkage on cure of less than 4 percent, and having a plurality of spaced-apart feed bores extending from end to end therethrough comprising:

a. a semipermeable membrane lining each of said feed bores; and b. means for sealing said membranes into the feed bores.

2. The open pore reverse osmosis membrane support module of claim 1 wherein the resin coating the filler particles is selected from the group consisting of phenolics, polyglycidyl ethers, polyesters, silicones, polystyrenes, polyimides, polyamide-imides, allyl resins and furahe resins.

3. The open pore reverse osmosis membrane support module of claim 2 containing at least one effluent bore, said module contained within a supporting casing.

4. The open bore reverse osmosis support module of claim 2 wherein the liquid-impermeable polymeric sealing composition comprises catalyst and polymers selected from the group consisting of polyglycidyl ethers, phenolics, polyesters, silicones, polystyrenes, polyimides, polamide-imides, polycarbonates, polyurethanes, polysulfones, polypropylene oxides, silicone rubbers, nitrile rubbers, butyl rubbers and polysulfide rubbers.

5. The open pore reverse osmosis support module of claim 4 wherein the liquid-impermeable sealing composition also contains filler particles having a granular structure and a particle size between 0.001 and 150 microns.

6. The open pore reverse osmosis support module of claim 4 wherein the membranes are sealed into the feed bores by means of an annular grommet having an outside diameter substantially the same as the inside diameter of the bore, said grommet being positioned inside the semipermeable membranes at the terminal ends of the module.

7. The open pore reverse osmosis support module of claim 4 wherein the membranes are sealed into the feed bores by means of an annular grommet having an outside diameter substantially the same as the inside diameter of the bore, said grommet having a circumferential groove around its outer surface and a mating O-ring the semipermeable membrane being interposed between said mating groove and O-ring said grommet being positioned inside the semipermeable membrane at the terminal ends of the module.

8. The open pore reverse osmosis membrane support module of claim 4, wherein the sealing composition polymer is a polyglycidyl ether.

9. The open pore reverse osmosis support module of claim 4 wherein the membranes are sealed into the feed bores by means of a water-curable liquid-impermeable polymeric adhesive which overlaps the membranes and contacts the polymeric sealing composition at the terminal ends of the feed bores.

10. The open pore tube of claim 9 wherein the water-curable polymeric adhesive comprises curing agent and polymer selected from the group consisting of thermoset resins and rubbers.

11. A reverse osmosis apparatus which comprises:
a. an open pore reverse osmosis membrane support module made of bonded resin-coated filler particles having a granular structure and an average particle size between 40 and 500 microns, the resin coating constituting about 2 to 18 percent of the coated filler particle weight, the module having terminal ends sealed with a liquid-impermeable polymeric sealing composition comprising catalyst and polymers selected from the group consisting of thermoset resins, thermoplastic resins, rubbers and mixtures thereof, said sealing composition having a postgellation shrinkage on cure of less than 4 percent, and having a plurality of spaced-apart feed bores extending from end to end therethrough;
a. a semipermeable membrane lining each of said feed bores;
c. means for sealing said membranes into the feed bores;
d. end plates having flat mating surfaces attached to the sealed terminal ends of said support module;
e. means to supply feed to one end of said bores under pressure;
f. means to exhaust feed from said other of said bores; and
g. means connecting ends of said bores to form a continuous passageway through aid support module.

12. The apparatus of claim 11 wherein the filler are coated by a resin selected from the group consisting of phenolics, polyglycidyl ethers, polyesters, silicones, polystyrenes, polyimides, polyamideimides, allyl resins and furane resins.

13. The apparatus of claim 12 wherein said support module is contained within a supporting casing.

14. The apparatus of claim 12 wherein the membranes are sealed into the feed bores by means of a liquid-impermeable water-curable polymeric adhesive which overlaps the membranes and contacts the polymeric sealing composition at the terminal ends of the feed bores.

15. The apparatus of claim 12 wherein the membranes are sealed into the feed bores by means of an annular grommet having an outside diameter substantially the same as the inside diameter of the bore, said grommet being positioned inside the semipermeable membranes at the terminal ends of the module.

16. The apparatus of claim 12 wherein the membranes are sealed into the feed bores by means of an annular grommet having an outside diameter substantially the same as the inside diameter of the bore, said grommet having a circumferential groove around its outer surface and a mating O-ring, the semipermeable membrane being interposed between said mating groove and O-ring, said grommet being positioned inside the semipermeable membrane at the terminal ends of the module.

17. The apparatus of claim 11 wherein said support module contains at least one effluent bore.

18. An open pore reverse osmosis membrane support module made of bonded resin-coated filler particles having a granular structure and an average particle size between 40 and 500 microns, the resin constituting about 4 to 32 volume percent of the coated module, the module having terminal ends sealed with a liquid-impermeable polymeric sealing composition comprising catalyst and polymers selected from the group consisting of thermoset resins, thermoplastic resins, rubbers and mixtures thereof, said sealing composition having a postgellation shrinkage on cure of less than 4 percent, and having a plurality of spaced-apart feed bores extending from end to end therethrough comprising:
a. a semipermeable membrane lining each of said feed bores; and
b. means for sealing said membranes into the feed bores.

19. The open pore reverse osmosis membrane support module of claim 18, wherein the sealing composition polymer is a polyglycidyl ether and has a viscosity range between about 5,000 to 100,000 cp. at 25° C.